(12) United States Patent  (10) Patent No.: US 7,907,764 B2
Matsuoka  (45) Date of Patent: Mar. 15, 2011

(54) APPARATUS, PROGRAM AND METHOD FOR MOTION ANALYSIS IN INTERNAL BODY

(76) Inventor: Hirochika Matsuoka, Nagasaki (JP)

( * ) Notice: Subject to any disclaimer, the term of this patent is extended or adjusted under 35 U.S.C. 154(b) by 498 days.

(21) Appl. No.: 11/197,590

(22) Filed: Aug. 5, 2005

(65) Prior Publication Data

US 2006/0029269 A1  Feb. 9, 2006

(30) Foreign Application Priority Data

Aug. 9, 2004 (JP) ................................ 2004-232579

(51) Int. Cl.
G06K 9/00 (2006.01)
(52) U.S. Cl. ........ 382/131; 382/128; 382/130; 382/282; 382/107; 600/443; 600/425; 348/169
(58) Field of Classification Search .................. 382/107, 382/131, 278, 103, 236, 128, 130; 600/425, 600/443; 348/169
See application file for complete search history.

(56) References Cited

U.S. PATENT DOCUMENTS

| 5,034,986 | A  | * | 7/1991  | Karmann et al. | ............. | 382/103 |
| 6,335,985 | B1 | * | 1/2002  | Sambonsugi et al. | ........ | 382/190 |
| 6,728,394 | B1 | * | 4/2004  | Chen et al. | ..................... | 382/107 |
| 7,236,559 | B2 | * | 6/2007  | Jha et al. | ........................... | 378/5 |
| 7,298,880 | B2 | * | 11/2007 | Nishiura | ........................ | 382/128 |
| 7,421,101 | B2 | * | 9/2008  | Georgescu et al. | ........... | 382/128 |

(Continued)

FOREIGN PATENT DOCUMENTS

DE  19930598 A1 * 7/2000

(Continued)

OTHER PUBLICATIONS

Abstract English translation for DE 19930598.*

Primary Examiner — Wesley Tucker
Assistant Examiner — Nancy Bitar
(74) Attorney, Agent, or Firm — Wenderoth, Lind & Ponack, L.L.P.

(57) ABSTRACT

When a motion in an internal body is analyzed by employing a tomographic image, a relative motion in an internal body is analyzed by moving a viewing point to an arbitrary place. The present invention is composed of: a tomographic image acquisition device 1 for acquiring a tomographic image of a subject targeted for observation; a motion analysis device 2 to which the tomographic image acquisition device 1 is connected, the analysis device performing a motion analysis from the tomographic image obtained by the tomographic image acquisition device 1; and a display device 3 connected to the motion analysis device 2, the display device displaying data outputted by the motion analysis device 2. The motion analysis device 2 includes image processing means 4 for processing the tomographic image obtained by the tomographic image acquisition device 1, point specification means 5 for specifying a plurality of arbitrary points on the tomographic image after image processing by the image processing means 4, viewing point conversion means 6 for converting a motion of a point serving as an observation point to a motion obtained by defining a point other than the observation point as a viewing point from among the plurality of points specified by the point specification means 5, and data output means 7 for outputting data obtained by the viewing point conversion means 6.

8 Claims, 20 Drawing Sheets

U.S. PATENT DOCUMENTS

| | | | |
|---|---|---|---|
| 2002/0146158 A1* | 10/2002 | Allouche | 382/128 |
| 2004/0121834 A1* | 6/2004 | Libby et al. | 463/19 |
| 2004/0234115 A1* | 11/2004 | Zijp et al. | 382/131 |
| 2005/0203395 A1* | 9/2005 | Sui et al. | 600/437 |
| 2006/0153867 A1* | 7/2006 | Li | 424/188.1 |
| 2006/0173292 A1* | 8/2006 | Baba et al. | 600/425 |
| 2007/0297657 A1* | 12/2007 | Mattes et al. | 382/128 |

FOREIGN PATENT DOCUMENTS

| | | |
|---|---|---|
| JP | 9-253085 | 9/1997 |
| JP | 2003-250804 | 9/2003 |
| JP | 2004-121834 | 4/2004 |
| JP | 2006153867 | * 11/2005 |

* cited by examiner

APPARATUS, PROGRAM AND METHOD FOR MOTION ANALYSIS IN INTERNAL BODY

BACKGROUND OF THE INVENTION

1. Field of the Invention

The present invention relates to an apparatus, program and method for motion analysis in an internal body, for analyzing a motion in an internal body by using a tomographic image.

2. Description of the Related Art

An ultrasonic diagnostic apparatus acquires a tomographic image of an inside of a target living body while using as a viewing point a probe placed on a surface of the living body targeted for observation. For example, in the case of a circulatory system such as the heart or blood vessels, and any other organ involving a motion, the motion of living body tissues constituting them is observed by using a tomographic image, and functions of these organs are diagnosed.

In recent years, it has been expected that the precision of diagnosis is improved more significantly if a function of the heart or the like can be quantitatively evaluated by the ultrasonic diagnosis apparatus. Unexamined Japanese Patent Publication No. 2004-121834 proposes an image diagnostic apparatus for acquiring a tomographic image of a subject, specifying a site to be tracked, of the tomographic image, by a mark; extracting a tomographic image which corresponds to the site specified by the mark, and tracking a motion of the tomographic image by the mark.

In the meantime, a motion of a living body local part is influenced by a motion of a distant living body local part as well as a motion of a proximal living body local part. This is because the living body local parts constitute the entirety while they are connected and associated with one another. The above image diagnosis apparatus of Unexamined Japanese Patent Publication No. 2004-121834 merely tracks a motion of a site specified in the entire tomographic image of the subject, and cannot perform diagnosis excluding an effect of the motion of the proximal site or distant site with respect to the specified site.

SUMMARY OF THE INVENTION

Therefore, it is an object of the present invention to provide an apparatus, program and method for motion analysis in an internal body, which are capable of analyzing a relative motion in an internal body while moving a viewing point to an arbitrary place when the motion in the internal body is analyzed by using a tomographic image.

An apparatus for motion analysis in an internal body according to the present invention has tomographic image acquisition means for acquiring a tomographic image of a subject; point specification means for specifying a plurality of arbitrary points on the tomographic image obtained by the tomographic image acquisition means; viewing point conversion means for converting a motion of a point as an observation point of the plurality of points specified by the point specification means to a motion obtained by using a point other than the observation point as a viewing point; and data output means for outputting data obtained by the viewing point conversion means.

A program for motion analysis in an internal body according to the present invention causes a computer to which tomographic image acquisition means for acquiring a tomographic image of a subject is connected, to function as: point specification means for specifying a plurality of arbitrary points on the tomographic image obtained by the tomographic image acquisition means; viewing point conversion means for converting a motion of a point as an observation point of a plurality of points specified by the point specification means to a motion obtained by using a point other than the observation point as a viewing point; and data output means for outputting data obtained by the viewing point conversion means.

A method for motion analysis in an internal body according to the present invention includes: acquiring a tomographic image of a subject; specifying a plurality of arbitrary points on the acquired tomographic image; converting a motion of a point as an observation point of the specified plurality of points to a motion obtained by using a point other than the observation point as a viewing point to obtain data; and outputting the obtained data.

According to these inventions, an arbitrary observation point on a tomographic image of a subject is converted to a motion of a point obtained by using an arbitrary viewing point as a reference, and data is outputted. In this manner, data on a motion of an observation point obtained by moving the viewing point to an arbitrary place is obtained.

Here, it is preferable that data on a trajectory of a motion of an observation point after conversion is outputted during data output. In this manner, a motion of an arbitrary observation point on a tomographic image of a subject is obtained as data on a trajectory of a motion of a point obtained by using an arbitrary viewing point as a reference.

Alternatively, it is preferable that a plurality of observation points after conversion are connected to one another by line segments to form a multi-node link, and that data on a motion of the multi-node link is outputted. In this manner, the motion of each observation point obtained by moving a viewing point to an arbitrary place is obtained as data on a motion of a multi-node link obtained by connecting these observation points to one another by line segments.

At this time, it is preferable that the motion of multi-node links is outputted as data on a motion obtained by using one of the multi-node links as a reference during data output. In this manner, the motion of the multi-node links obtained by connecting by line segments the observation points obtained by moving a viewing point to an arbitrary place are obtained as data on a motion obtained by using one multi-node link as a reference.

(1) A tomographic image of a subject is acquired; a plurality of arbitrary points on the obtained tomographic image are specified; a motion of a point as an observation point from among the plurality of specified points is converted to a motion obtained by using a point other than the observation point as a viewing point; and the obtained data is outputted. With this construction, data on a motion of an observation point obtained by moving a viewing point to an arbitrary place is obtained, and a motion of a relative motion in an internal body can be analyzed from the viewing point, thus making it possible to perform analysis excluding an effect of a motion of a proximal living body local part or a distant living body local part with respect to a site of the specified living body local part in the internal body. In addition, by this viewing point conversion, a motion of a proximal living body local part or a distant living body local part which is an external force of moving the living body local part (polyergic) and a motion of a specified living body local part (automatic) are distinctively compared with each other, and diagnosis can be performed.

(2) With a construction of outputting data on a trajectory of a motion of an observation point after conversion, a motion of an arbitrary observation point on a tomographic image of a subject is obtained as data on a trajectory of a motion of a point obtained by using an arbitrary viewing point as a reference, thus making it possible to analyze a relative motion in an internal body from data on the trajectory.

(3) With a construction of forming a multi-node link by connecting a plurality of observation points after conversion to one another by line segments, and then, outputting data on a motion of the multi-node link, the motion of each observation point obtained by moving a viewing point to an arbitrary place is obtained as data on the motion of the multi-node link obtained by connecting these observation points to one another by line segments, thus making it possible to analyze a motion of a relative position (angle) of each observation point (for example, angle speed, angle acceleration, angle strain, or angle strain rate) as well as the motion of each observation point obtained by moving a viewing point to an arbitrary place.

(4) With a construction of outputting a motion of multi-node links as data on a motion obtained by using one of the multi-node links as a reference, a motion of a multi-node link obtained by connecting the observation points obtained by moving a viewing point to an arbitrary place by line segments is obtained as data on a motion obtained by using one multi-node link as a reference, thus making it possible to analyze a motion of a relative position (angle) with respect to a reference position of each observation point. In addition, a center of a motion in the entire multi-node link and an axis of the motion can be obtained by comparing a difference in area, movement direction, and movement speed of each of the multi-node links obtained by repeating viewing point conversion. A displacement between the center and axis of this movement is studied, thereby making it possible to perform evaluation of motion. Moreover, by clarifying the center and axis in a normal motion, these normal cases are stored in an apparatus as a template to be called up when diagnosing an abnormal case, thereby making it possible to perform automatic diagnosis by comparing the abnormal case with the center and axis in the normal case as standards.

DESCRIPTION OF THE PREFERRED EMBODIMENTS

Figure 1:
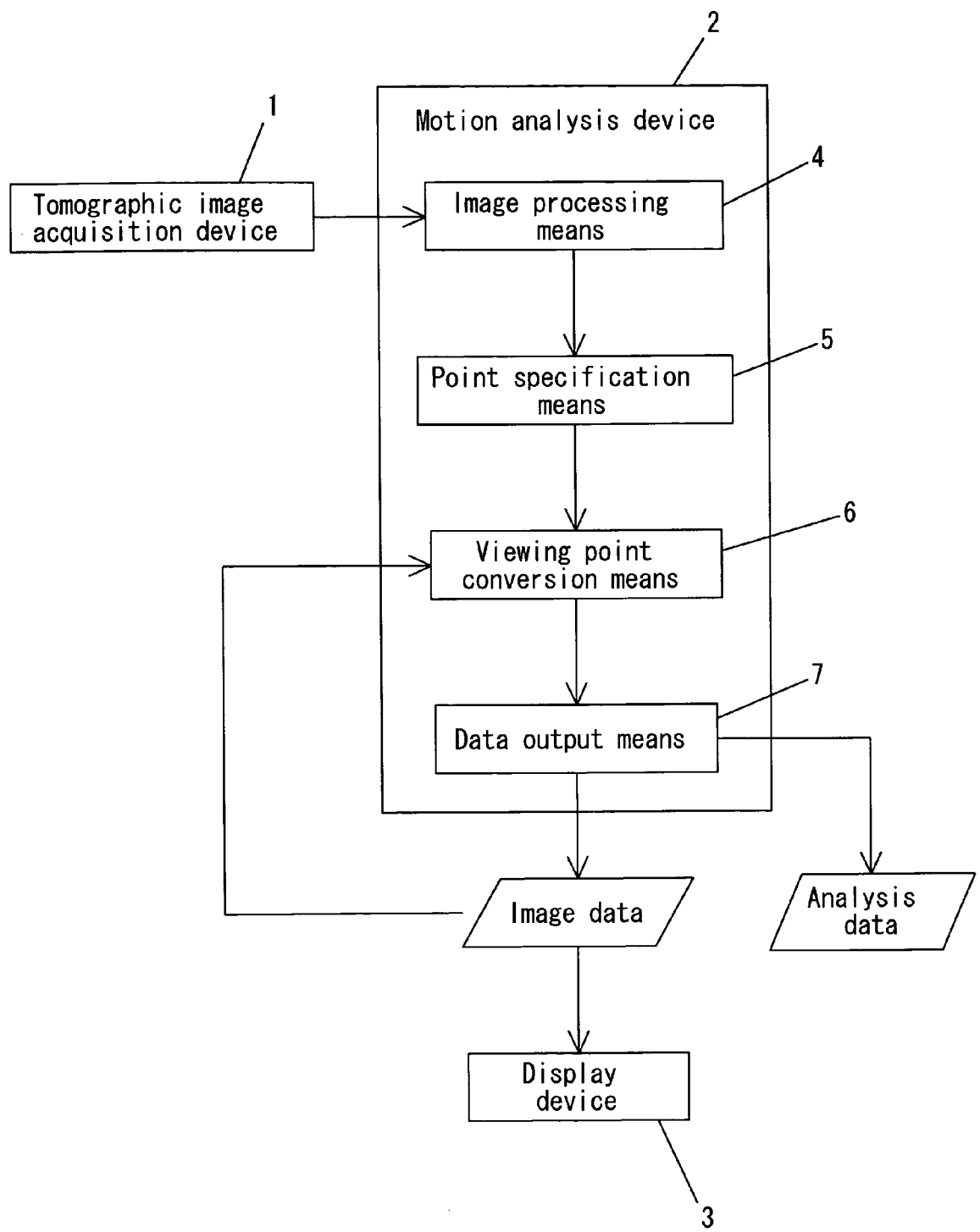
FIG. 1 is a block diagram depicting a configuration of an apparatus for motion analysis in an internal body in accordance with an embodiment of the present invention.

FIG. 1 is a block diagram depicting a configuration of an apparatus for motion analysis in an internal body in one embodiment of the present invention. In FIG. 1, the apparatus for motion analysis in an internal body in the embodiment of the invention is composed of: a tomographic image acquisition device 1 for acquiring a tomographic image of a subject targeted for observation; a motion analysis device 2 to which the tomographic image acquisition device 1 is connected, for performing motion analysis processing from the tomographic image obtained by the tomographic image acquisition device 1; and a display device 3 connected to the motion analysis device 2, for displaying data outputted by the motion analysis device.

The tomographic image acquisition device 1 in the embodiment is a publicly known ultrasonic tomographic image device for transmitting an ultrasonic wave from a probe brought into intimate contact with a surface of a subject, tracking reflected ultrasonic waves, electrically amplifying the waves, and performing image conversion, thereby obtaining the tomographic image of the subject. Available examples of the tomographic image acquisition device 1 include a magnetic resonance imaging (MRI) apparatus and an X-ray computer tomographic imaging (CT) apparatus as well as the ultrasonic tomographic image acquisition device.

The motion analysis device 2 has: image processing means 4 for processing an image of the tomographic image obtained by the tomographic image acquisition device 1; point specification means 5 for specifying a plurality of arbitrary points on the tomographic image after image-processing by the image processing means 4; viewing point conversion means 6 for converting a motion of a point as an observation point of the plurality of points specified by the point specification means 5 to a motion obtained by using a point other than the observation point as a viewing point; and data output means 7 for outputting data obtained by this viewing point conversion means 6. The motion analysis device 2 is implemented by operating a program for motion analysis in an internal body over a computer.

The image processing means 4 performs image processing such as reforming, frame division, optimization, enhancement processing or background processing as required with respect to the tomographic image obtained by the tomographic image acquisition device 1. In the case where an image inputted from the tomographic image acquisition device 1 is analog data, the image processing means 4 converts the analog data to digital data before performing a variety of image processing operations. In the case of digital data, on the other hand, the image processing means 4 performs image processing as it is.

Figure 3A:
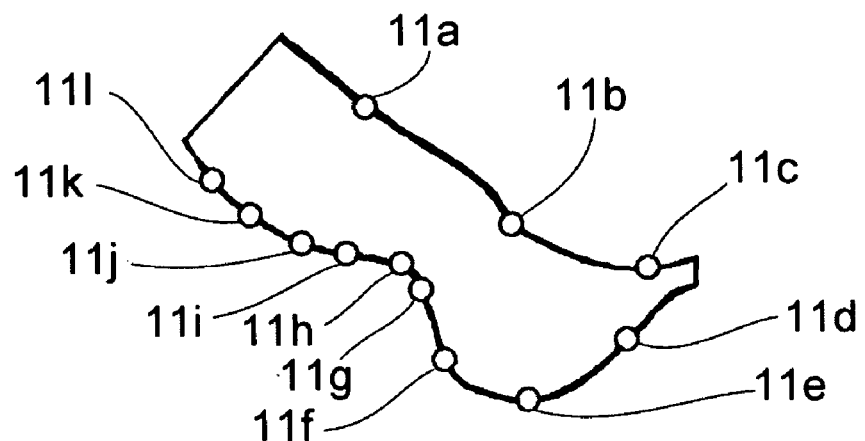
FIG. 3A is a view showing an example in which 12 points on a living body (interventricular septum myocardium) have been specified as an observation point.

The point specification means 5 arbitrarily specifies an observation point and a viewing point on a tomographic image by a keyboard, a pointing device or the like (not shown) provided at the motion analysis device 2. It is also possible to specify an observation point and a viewing point separately, or to specify them all together and select an observation point and a viewing point later. FIG. 3A shows an example of specifying 12 points 11a, 11b, 11c, 11d, 11e, 11f, 11g, 11h, 11i, 11j, 11k, and 11l on a living body (the interventricular septum myocardium) as an observation point.

Figure 4A:
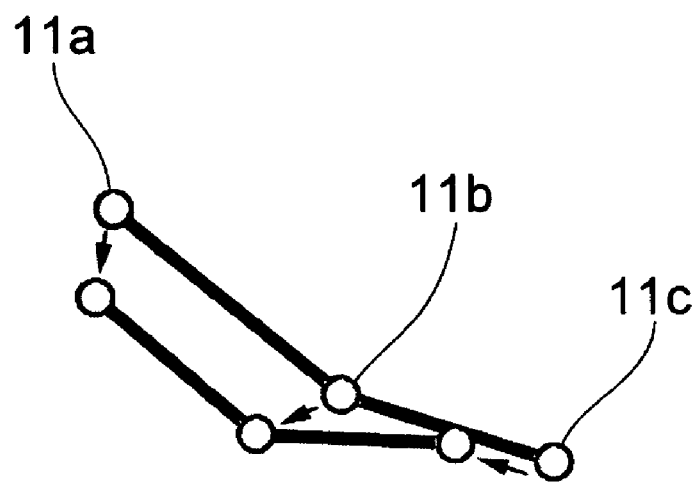
FIG. 4A is a view showing an example of viewing point conversion.

The viewing point conversion means 6 converts a motion of an observation point to a motion obtained by using a viewing point other than the observation point, from among the plurality of points specified by the point specification means 5. For example, in the case where the point 11b shown in FIG. 4A is defined as a viewing point, and the points 11a and 11c proximal to the point 11b are defined as an observation point, the viewing point conversion means 6 converts the motion of points (observation points) 11a and 11c to a motion obtained by using the point 11b as a viewing point (refer to FIG. 4B.). That is, the viewing point conversion means 6 fixes the motion of the viewing point 11b, and calculates a relative motion of the observation points 11a and 11c with respect to the viewing point 11b.

Figure 3B:
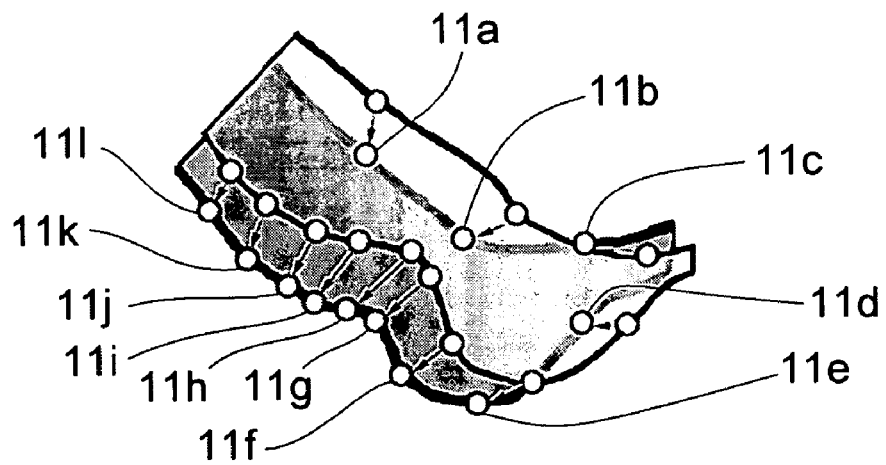
FIG. 3B is a view showing how tracking of each point is performed.

Here, the viewing point conversion means 6 tracks the motions of the points 11a to 11l specified by the point specification means 5 when the above viewing point conversion is performed. This tracking is performed by automatic identification or manual identification. FIG. 3B shows how tracking of the points 11a to 11l is performed. In the case of automatic identification, the viewing point conversion means 6 performs identification by tracking points having high degree of matching of the points 11a to 11l of an image in each frame based on an image color, density, shape, distribution and the like (coincidence technique (matching technique)). Alternatively, the viewing point conversion means 6 predicts a movement position from a trajectory immediately before the points 11a to 11l, and makes a search around the predicted point, thereby performing identification of the points 11a to 11l. At this time, in the case where the corresponding point is not found at the predicted position when the immediately preceding motion is stopped or gradually slower, there is a possibility that a rapid motion change occurs. Thus, a search is made by expanding a range. It is possible to combine identification based on a color, density, a shape, distribution and the like of the above image with identification based on predictive search, or to select a priority of the identification method when these identifications are combined with each other.

In addition, as a result of automatic identification, in the case where probability is high, "○" is displayed; in the case where probability is uncertain, "? " is displayed; and in the case where searching is impossible, "X" is displayed to cause a user to make a visual check. In order to facilitate visual check, it is also possible to make each frame of an image and a trajectory semi-transparent to make a layer display (semi-transparent superimposed image display) or to make a display by utilizing an animation effect such as a residual image. In this manner, a user can make check and correction or can switch to manual identification. In the case where searching is continuously impossible, automatic identification is stopped. The semi-transparent superimposed image used here is display means which easily discriminates a phase difference and image acquisition means which keeps image acquisition conditions constant at the time of image acquisition. For example, in the case where an attempt is made to compare a preoperative state with a postoperative state, a pre-administrative state with a post-administrative state, or a state at the time of an occurrence of arrhythmia with a state at the time of non-occurrence of arrhythmia, when examination is newly performed, a previously acquired image is superimposed as a semi-transparent image on an image to be acquired, and the superimposed image is used as a reference for image acquisition, thereby making it possible to keep the pre-acquisition or post-acquisition conditions as identical to each other as possible, and acquire an image for precise comparison.

Figure 5:
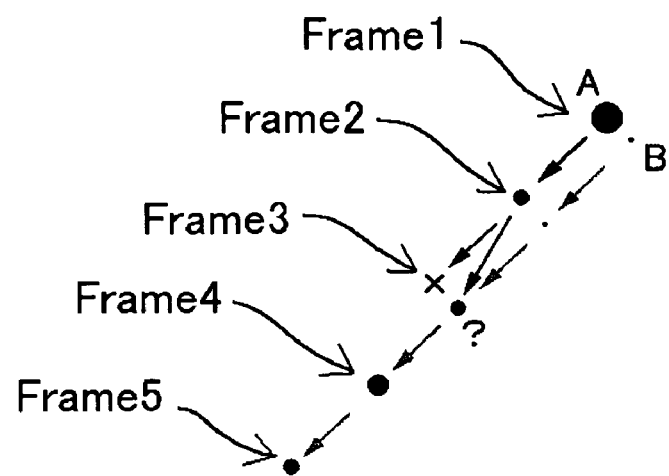
FIG. 5 is an illustrative view illustrating a relay type (transfer type) tracking technique.

When an observation point moving in a three-dimensional manner is tracked on a two-dimensional plane, the observation point may disappear from a screen due to a motion in a vertical direction relevant to the plane. In this case, this problem cannot be resolved only by increasing the number of frames per a unit time of a mobile image (for example, per second). As a method for resolving this problem, there is employed a relay type (transfer type) tracking technique for setting a new proximal observation point to continue tracking. As shown in FIG. 5, while tracking is performed after point A in points A and B is specified as an observation point, point A does not appear at a predictive search point (X) in frame 3. In the case where analysis is impossible, it is verified that point B proximal to point A does not vary in positional relationship, point B is specified instead of point A, and tracking is performed. In this manner, it is possible to complete motion analysis in regions of points A and B from frame 1 to frame 5.

The data output means 7 outputs data obtained by the viewing point conversion means 6. The data output means 7 can output raw data obtained by the viewing point conversion means 6 and can output image data, analysis data and the like generated from the raw data. A printer device, a data recording medium and the like as well as the display device 3 can be selected as an output destination of the data output means 7.

Figure 4B:
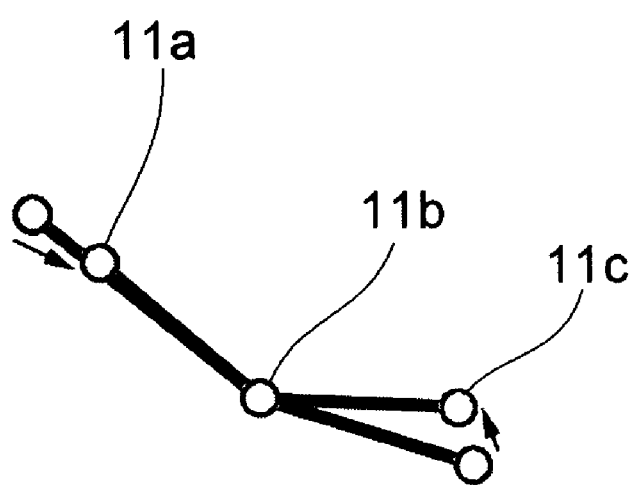
FIG. 4B is a view showing an example of viewing point conversion.

For example, the data output means 7 fixes a position of point 11b as a viewing point, as shown in a display example of FIG. 4B with respect to a case in which the motions of points (observation points) 11a and 11c have been converted by the viewing point conversion means 6 to a motion obtained by using the point 11b as a viewing point, as described previously, and outputs data obtained by changing only the dispositions of observation points 11a and 11c with respect to the point 11b.

Figure 6:
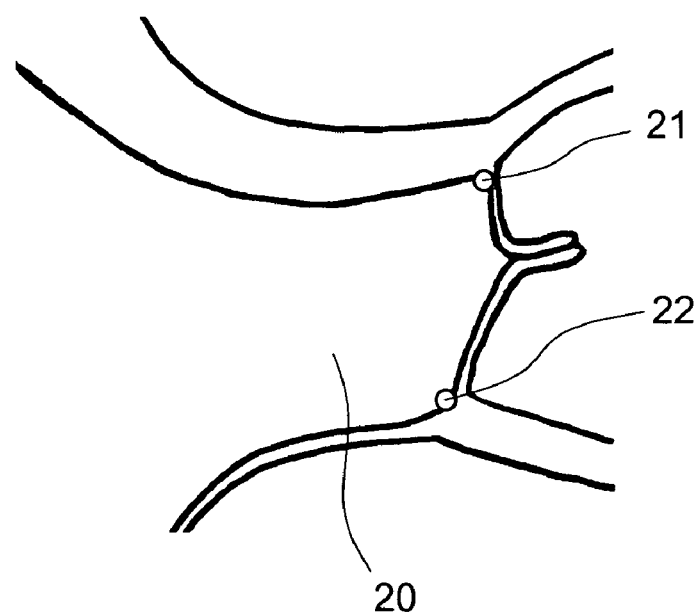
FIG. 6 is a view showing an example of point specification using point specification means.
Figure 7:
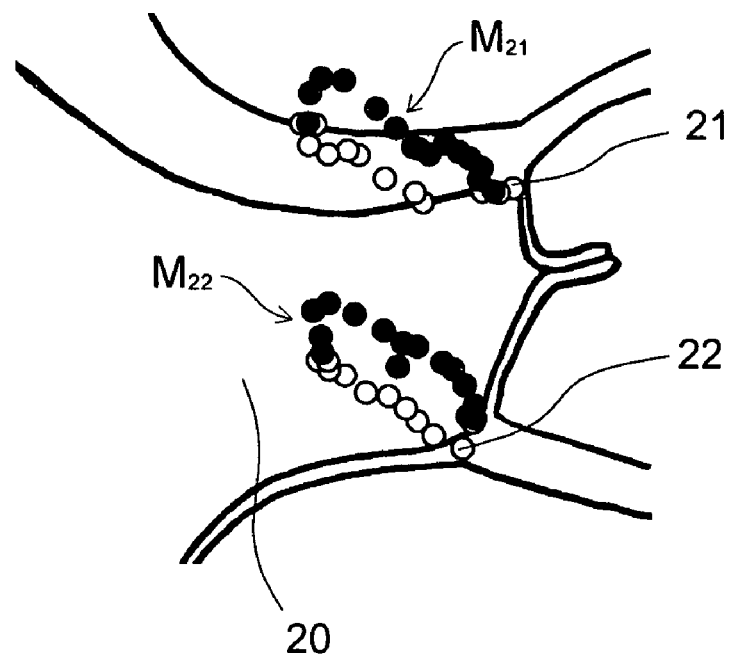
FIG. 7 is a view showing an output example of data on a trajectory of a motion of two points.

In addition, the data output means 7 can output data on a trajectory of an observation point after conversion, the observation point being obtained by the viewing point conversion means 6. For example, in the case where the point specification means 5 specifies two points (interventricular septum side aortic annulus part 21 and left atrium side aortic annulus part 22) of a living body (left ventricle outflow tract 20) as shown in FIG. 6, when data on a trajectory of motions of two points 21 and 22 is outputted by the data output means 7 without making viewing point conversion by the viewing point conversion means 6, a screen is displayed on the display device 3 as shown in FIG. 7 (the systole and diastole are indicated by the open circle and the filled circle, respectively). In an example of FIG. 7, two points 21 and 22 move clockwise.

Figure 8:
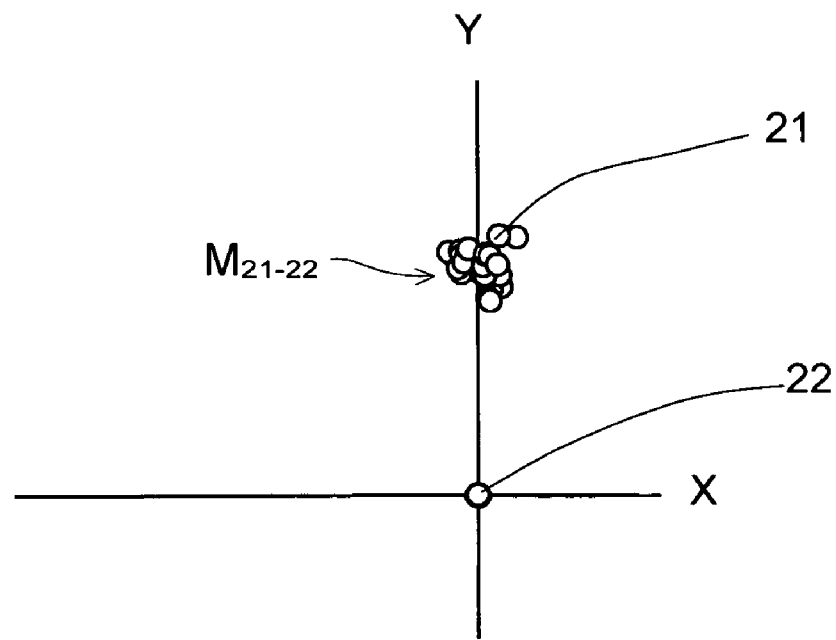
FIG. 8 is a view showing an example in which viewing point conversion is performed while a point of the left atrium side aortic annulus part is used as a viewing point and a point of the interventricular septum side aortic annulus part is used as an observation point.

However, if point 22 of the left atrium side aortic annulus part is used as a viewing point by the viewing point conversion means 6; viewing point conversion is performed by the viewing point conversion means 6 with point 21 of the interventricular septum side aortic annulus part being an observation point; and data on a trajectory of a motion of the observation point 21 after conversion is outputted by the data output means 7, then a screen is displayed on the display device 3 as shown in FIG. 8. In the example of FIG. 8, an X axis and a Y axis are displayed while the point 22 of the left atrium side aortic annulus part serving as a viewing point is defined as an origin.

In the case where a motion outputted by the data output means 7 is evaluated based on FIG. 8, it is necessary to analyze this motion by dividing it into two components. This motion is composed of one's own motion (active motion) and a motion due to an external force (passive motion). Alternatively, this motion can be referred to as a local motion and an entire motion or as a motion of a local part and a motion of peripheral part. Further, the following concept of automaticity and passivility can be expressed as an indicator of evaluating and comparing a motion such as an active motion:

Automaticity=Active/(Active+Passive)

Passivility=Passive/(Active+Passive)

The degrees of active and passive motions can be numerically defined by an area, a distance, a speed and the like, in a movement region.

In FIG. 8, in the case where it is determined that point 22 is a site which does not have an automaticity, trajectory $M_{22}$ of point 22 shown in FIG. 7 represents a motion due to only a force externally applied to the point 22, that is, a passive motion. On the other hand, in the case where it is determined that trajectory $M_{21\text{-}22}$ of point 21 shown in FIG. 8 is a motion due to an automaticity, trajectory $M_{21\text{-}(21\text{-}22)}$ obtained by subtracting trajectory $M_{21\text{-}22}$ of point 21 shown in FIG. 8 from trajectory $M_{21}$ of point 21 shown in FIG. 7 indicates a passive motion due to an external force acting on point 21.

In this manner, a motion in point 21 can be divided into an active motion and a passive motion, ratio of trajectory $M_{21\text{-}22}/M_{21}$ (for example, a ratio of a movement distance and a movement area) is obtained, thereby making it possible to evaluate a regional motion based on the concept of the automaticity and passivility (for example, when 0% is set, no automaticity is provided; when 50% is set, automaticity and passivility is 1:1; and when 100% is set, only automaticity is provided). In addition, automaticity and passivility in each site can be compared. For example, comparison of automaticity in points 21 and 22 can be represented by ratio of trajectory $M_{22\text{-}21}/M_{21}$ to 0, and in comparison of passivility, the comparison result is represented by a ratio of trajectory $M_{21\text{-}(21\text{-}22)}/M_{21}$ to $M_{22}/M_{22}$.

Figure 3C:
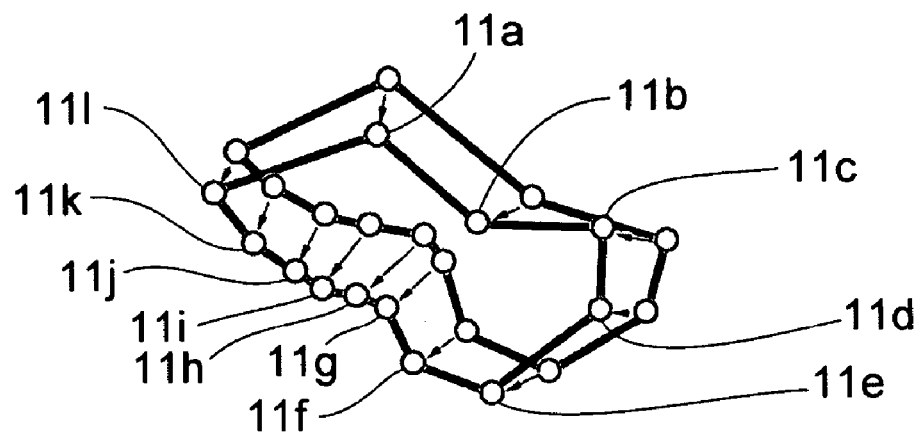
FIG. 3C is a view showing an output example of data on a motion of a multi-node link.
Figure 11A:
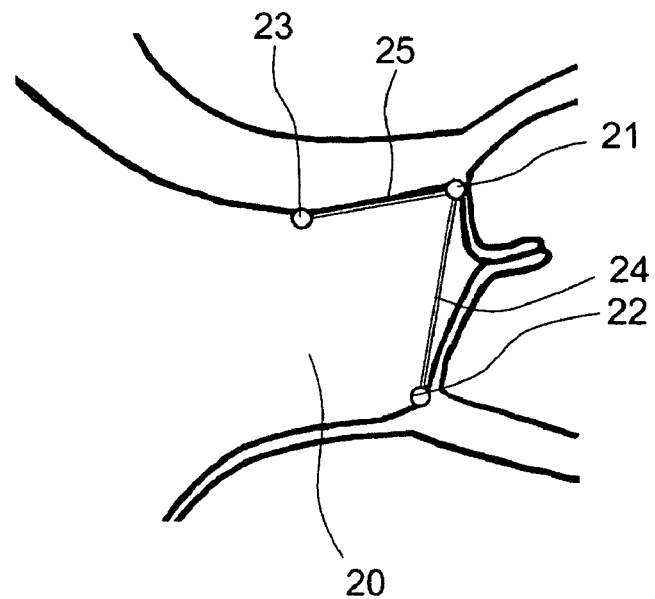
FIG. 11A is a view showing an example in which three points of a living body are specified.
Figure 11B:
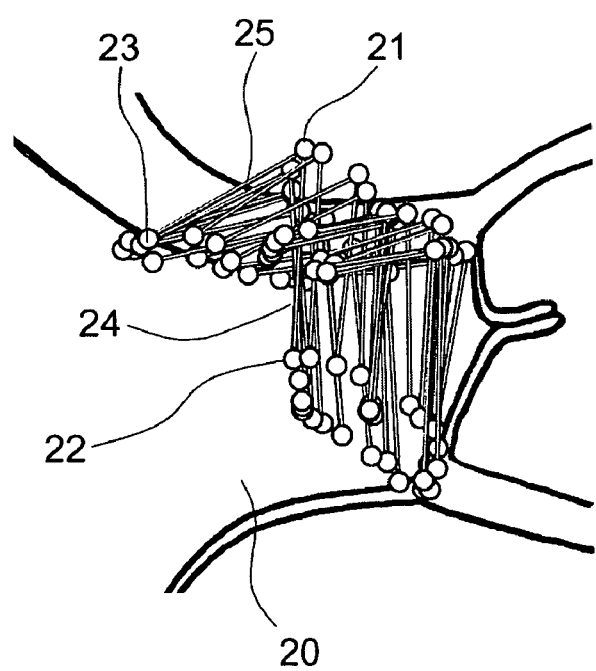
FIG. 11B is a view showing an output example of data on a motion of a multi-node link obtained by connecting each observation point and a viewing point to each other by line segments before viewing point conversion.

In addition, the data output means 7 forms a multi-node link by connecting a plurality of observation points to one another by line segments, making it possible to output data on a motion of the multi-node link (refer to FIG. 3C.). For example, the point specification means 5, as shown in FIG. 11A, specifies three points of a living body (the left ventricle outflow tract 20) (the interventricular septum side aortic annulus part 21, left atrium side aortic annulus part 22, and left ventricle outflow tract front part 23), and the observation points 21, 22, and 23 are connected to one another by line segments to form multi-node links 24 and 25. Then, data on motions of these multi-node links 24 and 25 is outputted. In this manner, on the display device 3, the motions of the multi-node links 24 and 25 composed of the observation points 21, 22, and 23 are displayed as shown in FIG. 11B.

Figure 3D:
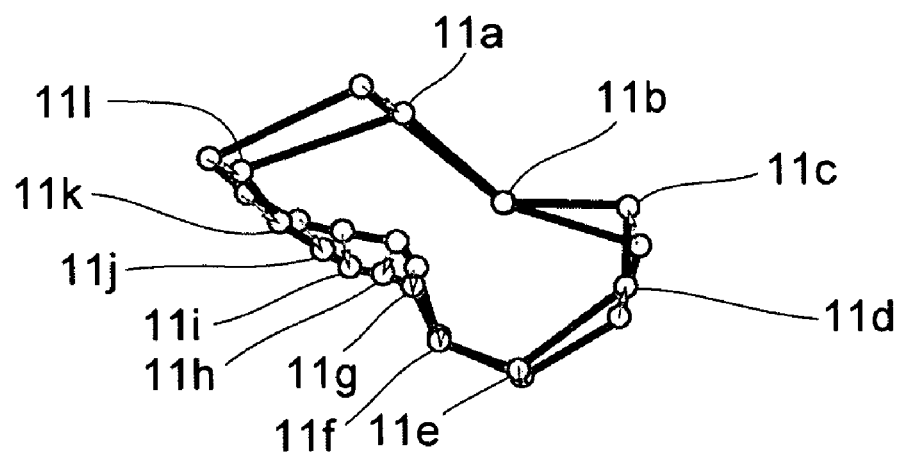
FIG. 3D is a view showing an output example of data on a motion obtained by using one multi-node link as a reference.
Figure 12A:
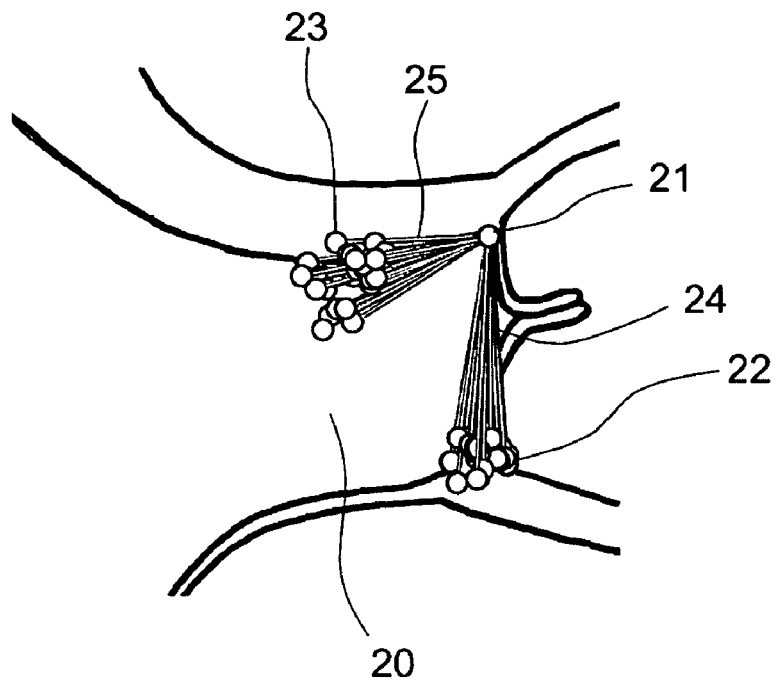
FIG. 12A is a view showing an example of outputting a viewing point as an origin to be moved in parallel to X-axis and Y-axis directions.
Figure 12B:
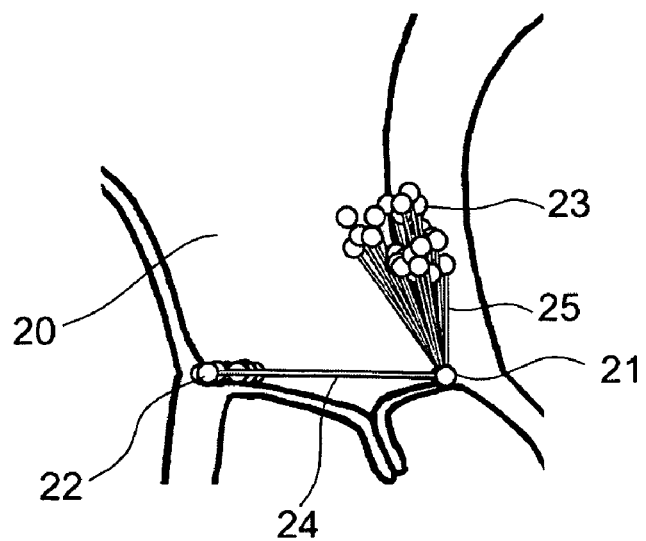
FIG. 12B is a view showing an example of rotating and outputting data on a motion while one multi-node link is defined as a reference.
Figure 13:
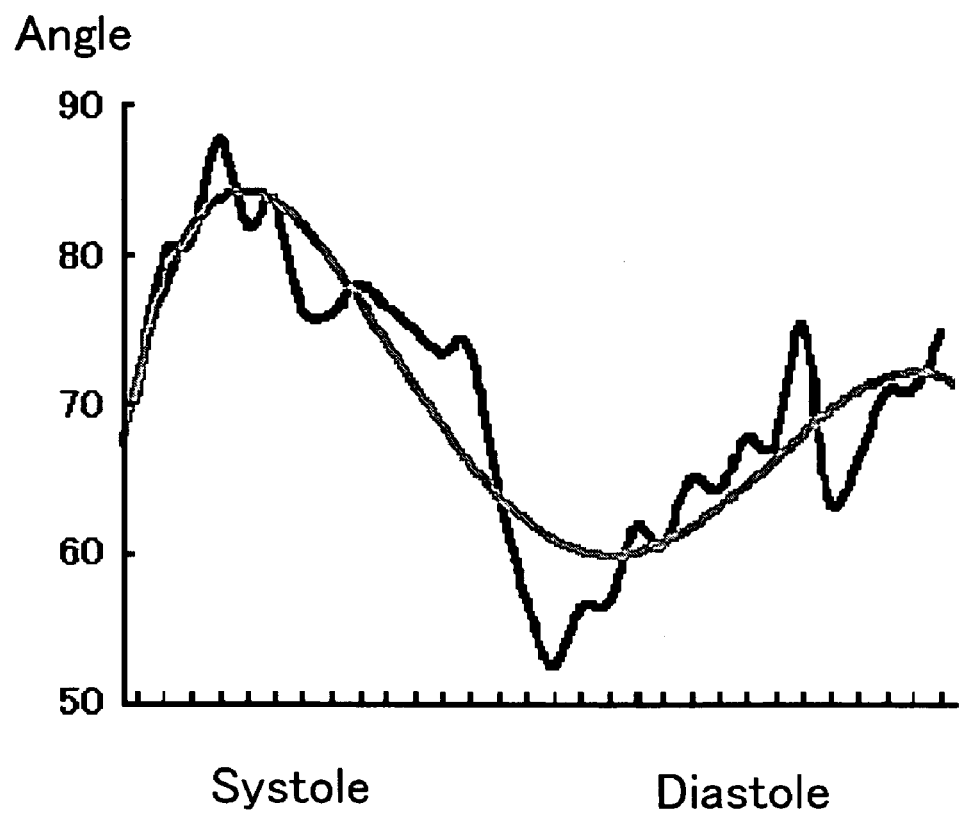
FIG. 13 is a view showing a graphic output example.

The data output means 7 can also output the motion of the thus formed multi-node link as data on a motion obtained by using one of the multi-node links as a reference by the viewing point conversion means 6 (Refer to FIG. 3D.). For example, viewing point conversion is performed by the viewing point conversion means 6 while the observation point 21 of FIG. 11B is used as viewing point 21, and the multi-node links 24 and 25 composed of each of the observation points 22 and 23 and the viewing point 21 after conversion are moved in parallel in X-axis and Y-axis directions and displayed while the viewing point 21 is defined as an origin, as shown in FIG. 12A. Alternately, the data on the motions of the multi-node links 24 and 25 is rotated such that the viewing point 21 is defined as an origin and that the viewing point 21 and the observation point 22 are parallel to the X axis. In this manner, around the multi-node link 24 (aortic annulus part) as shown in FIG. 12B, an angle formed between the multi-node link 24 and the point 23 (the multi-node link 25) of the left ventricle outflow tract front part is displayed on the display device 3. The data output means 7 is further capable of outputting the angle as data on a graph depicted in FIG. 13. In FIG. 13, angle data is represented by the black line, and its interpolation function is represented by the gray line.

In an action, a center and an axis of a motion exist. In a human body, joints of limbs, spine and the like become the center or axis of the motion, whereby a motion at the time of a walk or sport is established. In motion analysis, it is necessary to obtain these motion center and motion axis and to make motion analysis around these center and axis. The center point and axis of the motion exist also in the cardiac motion, and it is possible to detect and evaluate these center point and axis by means of viewing point conversion using the above viewing point conversion means 6.

Figure 9A:
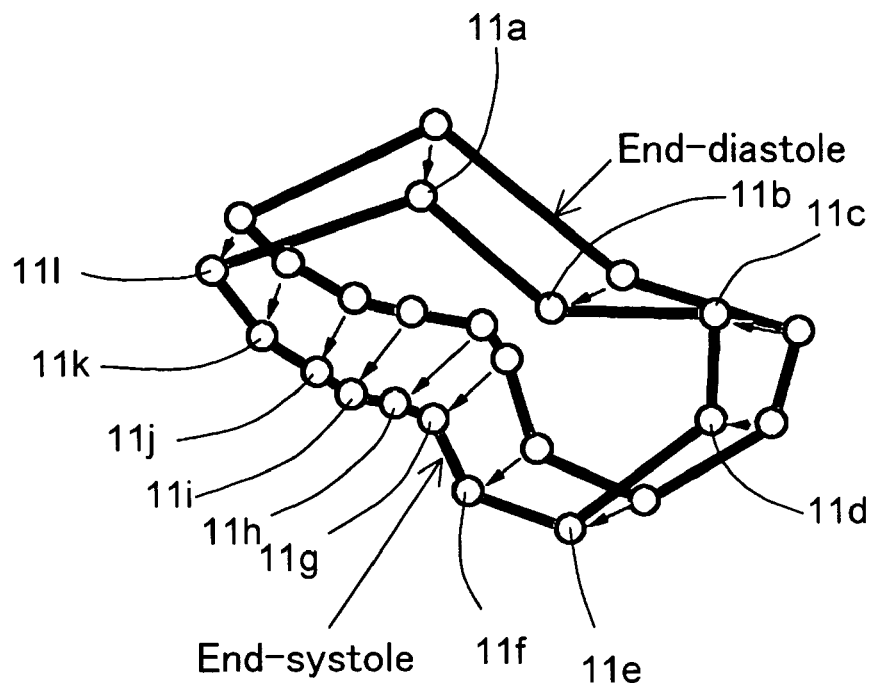
FIG. 9A is a view showing an example of forming a multi-node link by connecting a plurality of observation points to one another by line segments in part of the interventricular septum myocardium in the end-diastole and end-systole, and outputting data on a motion of the multi-node link.
Figure 9B:
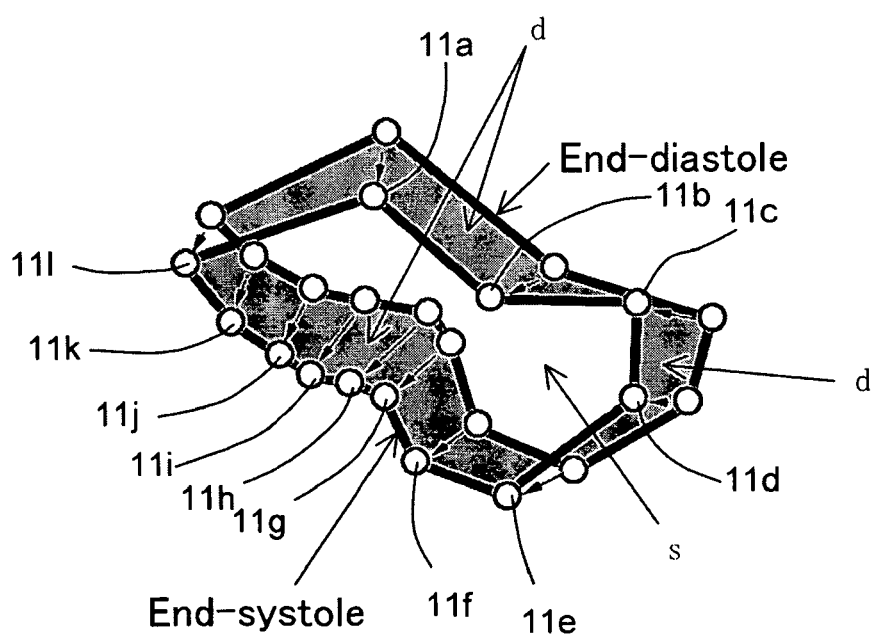
FIG. 9B is a view showing an example of gray-displaying a region in which there is a phase difference of FIG. 9A.
Figure 10A:
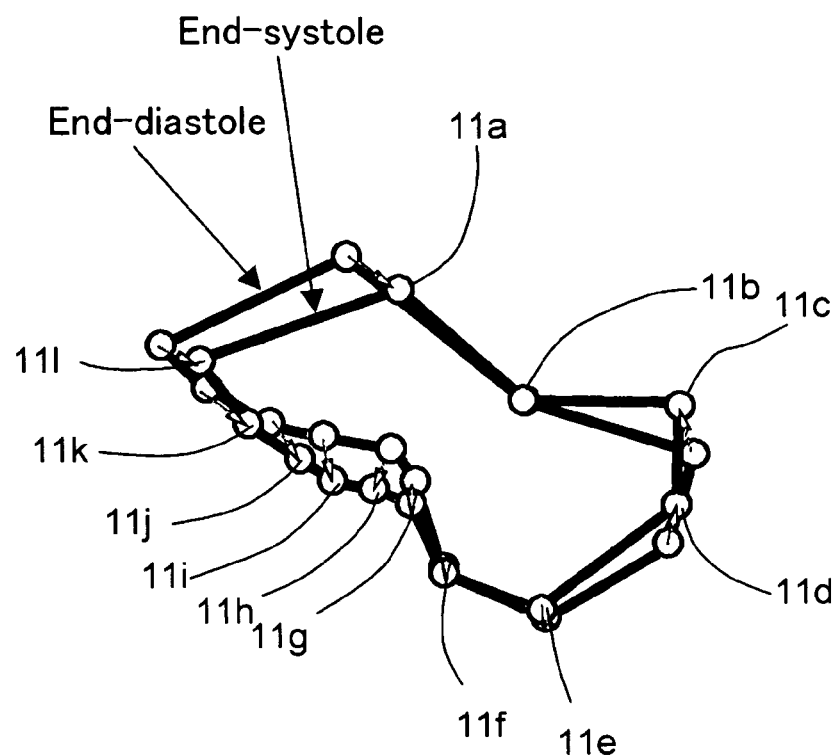
FIG. 10A is a view showing an image after viewing point conversion while point 11b of FIG. 9A is defined as a viewing point.

FIG. 9A is a view showing an example of forming a multi-node link by connecting a plurality of observation points in part of the interventricular septum myocardium by line segments to form a multi-node link in an end-diastole and an end-systole, and then, outputting data on a motion of the multi-node link; and FIG. 9B is a view showing an example of gray-displaying a region in which there is a phase difference of FIG. 9A. FIG. 10A is a view showing an image obtained after viewing point conversion is performed while the point 11b of FIG. 9A is defined as a viewing point; and FIG. 10B is a view showing an example of gray-displaying a region in which there is a phase difference of FIG. 10A.

Figure 10B:
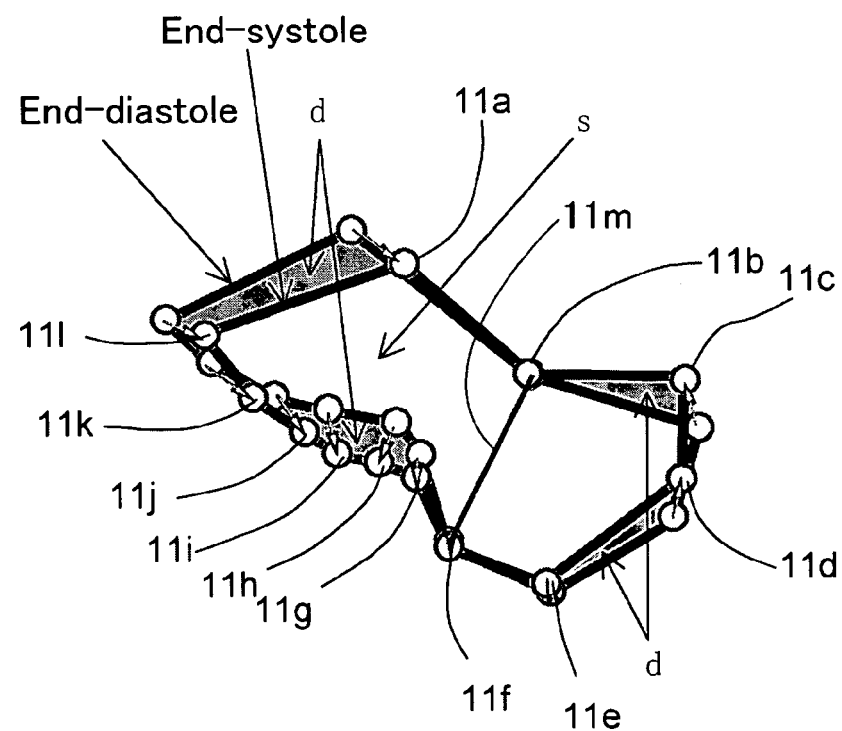
FIG. 10B is a view showing an example of gray-displaying a region in which there is a phase difference of FIG. 10A.

As is evident from these figures, by performing viewing point conversion, a region "d" in which there is a phase difference displayed by the gray in FIG. 9B decreases in FIG. 10B. Further, viewing point conversion is sequentially performed while points 11a to 11l are defined as viewing points, respectively, and areas of respective regions "d" are compared with each other. As a result, if an area of the region "d" is minimal in the case where the viewing point is placed at point 11b, and the second smallest is 11f, then it is judged that a motion axis of a myocardium surrounded by line segments is present on line segment 11m which connects points 11b and 11f to each other, and it is deemed that the motion center is close to point 11b on the line segment. In addition, it is found that the right side portion moves more upwardly than the line segment 11m which connects the lines 11b and 11f to each other and the left side portion moves downwardly. By such a method, it is possible to determine the motion center and motion axis. Apart from comparison of individual areas of the region "b" in the case where viewing point conversion is performed, it is possible to determine the motion center and motion axis by comparison of an overlapped dimension of an end-diastole and an end-systole indicated by a region "s" or by comparison of sums of motion vectors at individual points indicated by the open arrow.

Figure 14A:
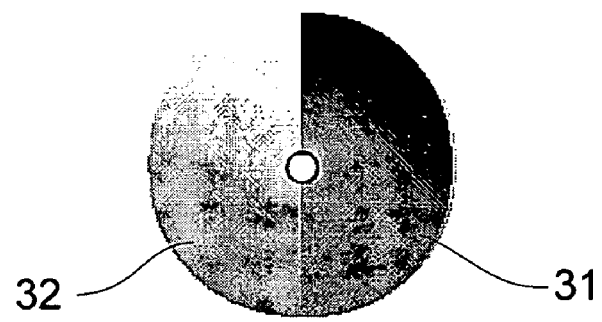
FIG. 14A is a view showing an exemplary color pallet when a motion direction and a motion speed (distance) of each point and multi-node link are displayed as a color.
Figure 14B:
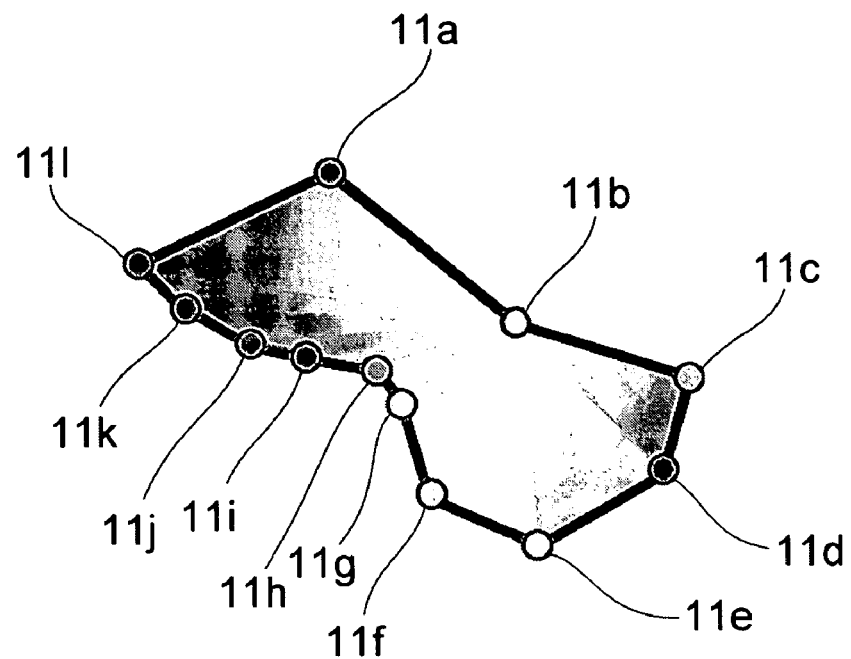
FIG. 14B is a view showing an example of simultaneously displaying the motion direction and the motion speed by the color indicated by the color pallet of FIG. 14A.

Further, the data output means 7 is capable of color-displaying a motion direction and a motion speed (distance) of each point and a multi-node link. In the case where color display is made, color arrangement minimizing use of red and green is selected in consideration of use of a person with poor color vision, and a barrier-free color according to color vision is used. For example, as shown in FIG. 14A, a motion direction from 0° to 180° is displayed by gradation 31 from orange to yellow, and a motion direction from 180° to 360° is displayed by gradation 32 from blue to water color. As the motion speed is lower, a color hue is displayed to be faint; and as the speed is higher, the color hue is displayed to be dark, whereby the motion direction and speed can be displayed as colors at the same time with a difference in color hue and density. In this manner, it is possible to easily visually recognize an entire image of a motion. FIG. 14B shows an example of displaying a motion direction and a motion speed at the same time by colors shown in a color pallet shown in FIG. 14A, the colors indicating a motion when the point 11b of the myocardium surrounded by the line segment composed of the observation points 11a to 11l is defined as a viewing point.

Figure 2:
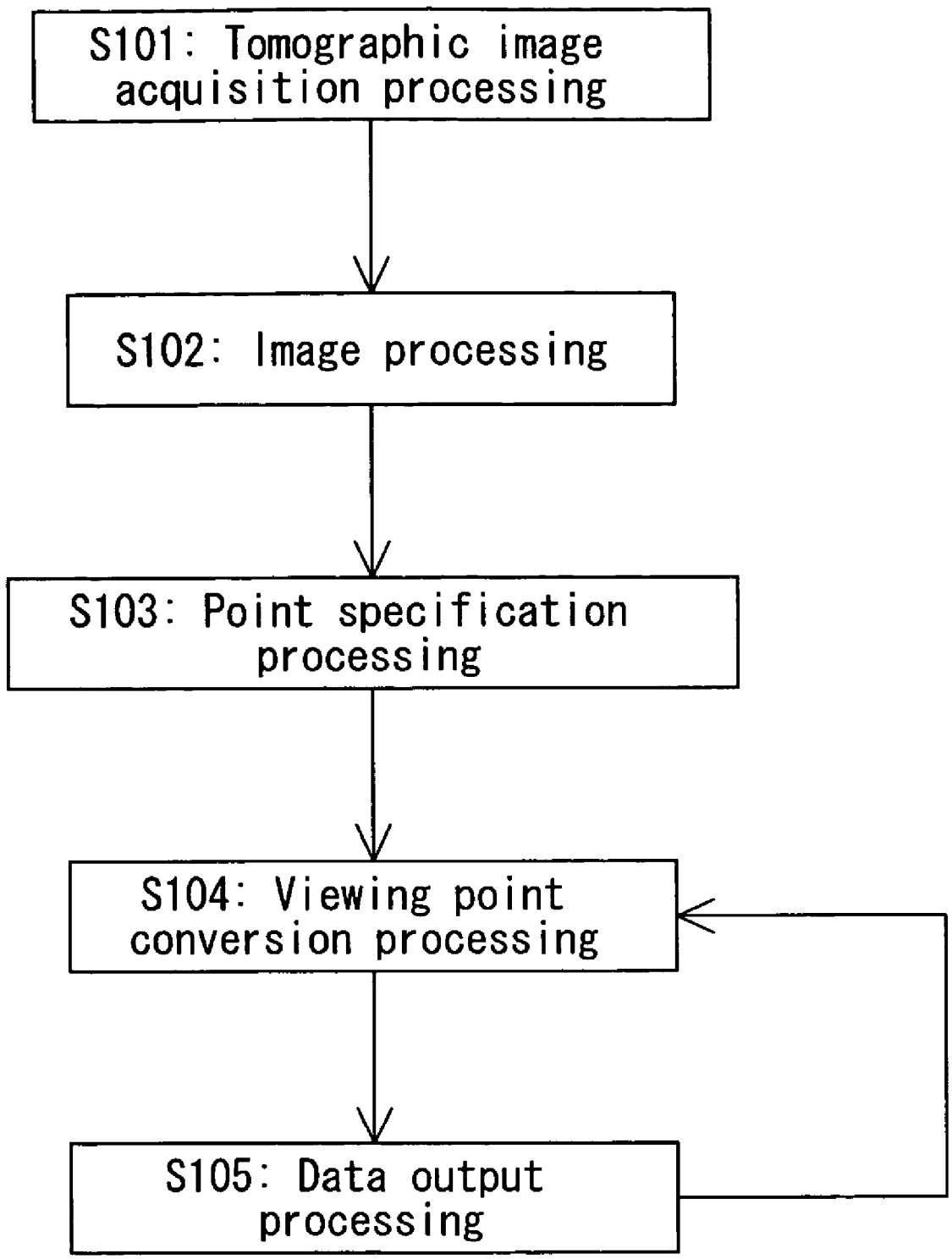
FIG. 2 is a flow chart showing motion analysis processing in an internal body.

Motion analysis in an internal body using the above configured apparatus for motion analysis in an internal body will be described along with a flow diagram of FIG. 2.

(S101) A tomographic image of an inside of a living body is obtained as a subject by the tomographic image acquisition apparatus 1.

(S102) A tomographic image obtained by the tomographic image acquisition device 1 is processed as required by the image processing means 4.

(S103) A plurality of arbitrary points obtained as an observation point and a viewing point are specified on a tomographic image after image processing, by the point specification means 5 (refer to point 21 of the interventricular septum side aortic annulus part; point 22 of the left atrium side aortic annulus part; and point 23 of the left ventricle outflow tract front part of FIG. 11A.).

(S104) A motion of a point defined as an observation point from among the plurality of points specified by the point specification means 5 is converted to a motion obtained by defining a point other than the observation point as a viewing point by the viewing point conversion means 6 (for example, the point 22 of the left atrium side aortic annulus part and the left ventricle outflow tract front part of FIG. 11A are defined as observation points, and the motions of these observation points are converted to the motions obtained by defining, as a viewing point, the point 21 of the interventricular septum side aortic annulus part.).

(S105) The data obtained by the viewing point conversion means 6 is outputted by the data output means 7. It is possible to input the data outputted by the data output means 7 to the viewing point conversion means 6 again and perform viewing point conversion of each observation point obtained by using another point as a viewing point.

As described above, in the apparatus for motion analysis in an internal body in the embodiment, a tomographic image of a subject is acquired; a plurality of arbitrary points on the obtained tomographic image are specified; a motion of a point obtained as an observation point of the plurality of specified points is converted to a motion obtained by using a point other than the observation point as a viewing point; and the obtained data is outputted. With this configuration, data on a motion of an observation point obtained by moving a viewing point to an arbitrary viewing point is obtained. In this manner, it is possible to analyze a relative motion in an internal body from an arbitrary viewing point. Thus, it is possible to perform diagnosis excluding an effect of a motion of a proximal living body local part or a distant living body local part with respect to a site of the specified living body local part in the internal body.

In the apparatus for motion analysis in an internal body in the embodiment, it is possible to output data on a trajectory of a motion of an observation point after conversion. In this manner, a motion of an arbitrary observation point on a tomographic image of a subject is obtained as data on a trajectory of a motion of a point obtained by using an arbitrary viewing point as a reference, thus making it possible to analyze a relative motion in an internal body from the data on the trajectory.

In the apparatus for motion analysis in an internal body in the embodiment, it is possible to form a multi-node link by connecting a plurality of observation points to one another after conversion by line segments to form a multi-node link, and to output data on a motion of the multi-node link. In this manner, the motion of each observation point obtained by moving a viewing point to an arbitrary place is obtained as data on a motion of a multi-node link obtained by connecting these observation points to each other by line segments, thus making it possible to analyze a motion of a relative position (angle) of each observation point as well as a motion of each observation point obtained by moving a viewing point to an arbitrary place.

In the apparatus for motion analysis in an internal body in the embodiment, it is possible to output a motion of multi-node links as data on a motion obtained by using one of the multi-node links as a reference. In this manner, the motion of the multi-node links obtained by connecting the observation points obtained by moving a viewing point to an arbitrary place by line segments is obtained as data on a motion obtained by using one multi-node link as a reference, thus making it possible to analyze a motion of a relative position (angle) with respect to a reference position of each observation point.

Figure 15:
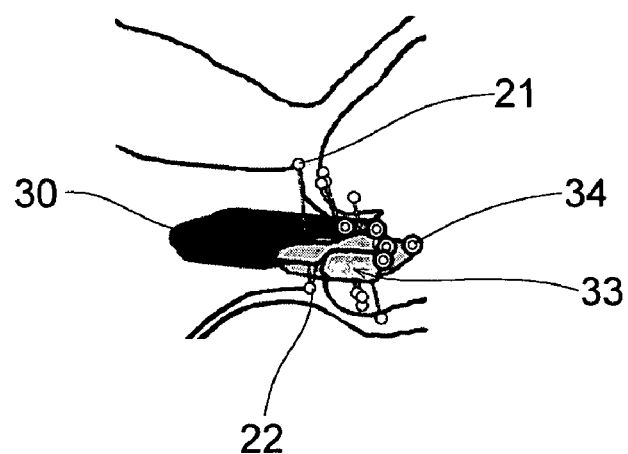
FIG. 15 is a view showing an example of specifying three points and displaying superimposing its movement.
Figure 16:
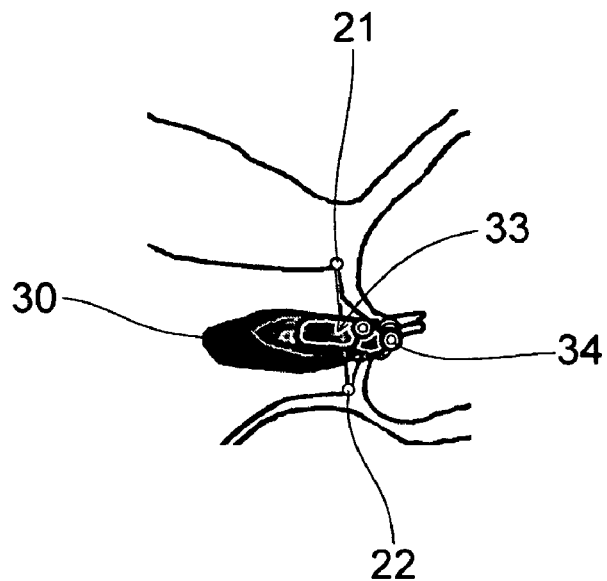
FIG. 16 is a view showing an output example of data on a motion of a regurgitation ejection port after viewing point conversion.

Further, the apparatus for motion analysis in an internal body in the embodiment is applicable for a color image obtained by the Doppler color flow imaging. In this case, color identification is performed for a color image of each frame of an aortic regurgitation (from the early diastole 30 to the end-diastole 33), and a regurgitation region of the aortic regurgitation is identified on a frame by frame basis. At the same time, the interventricular septum side aortic annulus part 21, the left atrium aortic annulus part 22, and a regurgitation ejection port 34 are specified on a point by point basis, and its motion is displayed to be superimposed (refer to FIG. 15). Then, by the viewing point conversion means 6, the point 21 of the interventricular septum aortic annulus part is used as an origin, and point 34 of the regurgitation ejection port obtained by using a line segment connecting two points 21 and 22 as an axis is displayed (refer to FIG. 16.). In this manner, a change in the area and direction of the aortic regurgitation region and a change in positional relationship with the aortic annulus part are clarified, making it possible to perform precise qualitative and quantitative evaluation in more detail, of the aortic regurgitation.

In the apparatus for motion analysis in an internal body in the embodiment, when viewing point conversion is performed as described previously, a motion of each point is automatically tracked in accordance with a coincidence technique (matching technique). However, it is difficult to track a subject whose motion per a unit time (inter-frame) is very large at only a point at which the degree of coincidence is the highest using this coincidence technique. In this case, it is necessary to perform tracking at a point at which the degree of coincidence is the lowest (based on the degree of non-coincidence). Alternatively, it is necessary to perform identification tracking (phase difference tracking technique) according to an extent of coincidence (the degree of non-coincidence). For example, the motion of a valve is very fast as compared with that of a myocardium. It is further difficult to track a disease-like motion of a valve based on ruptured chordae tendineae or valve deviation.

Figure 17A:
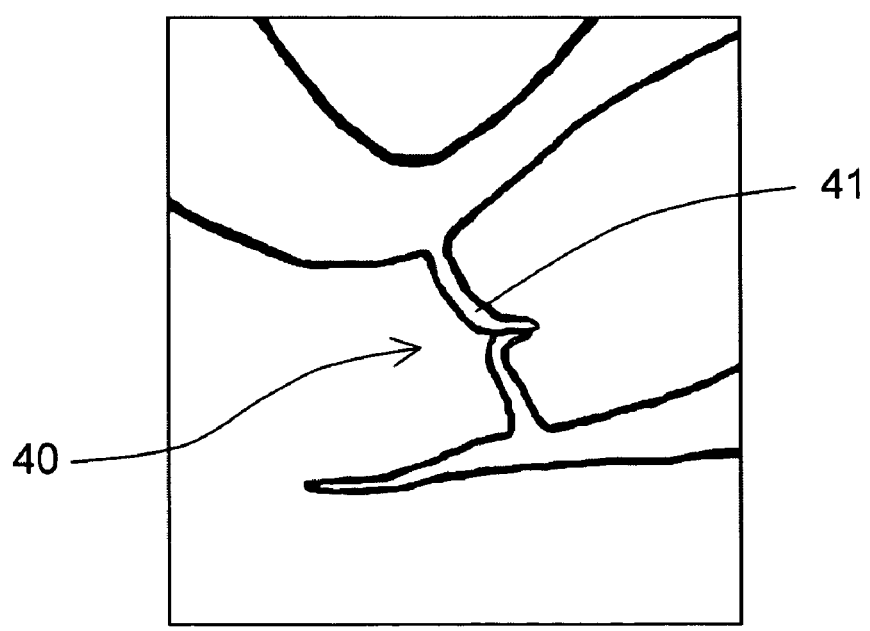
FIG. 17A is a view showing a one-frame image of the aortic valve.
Figure 17B:
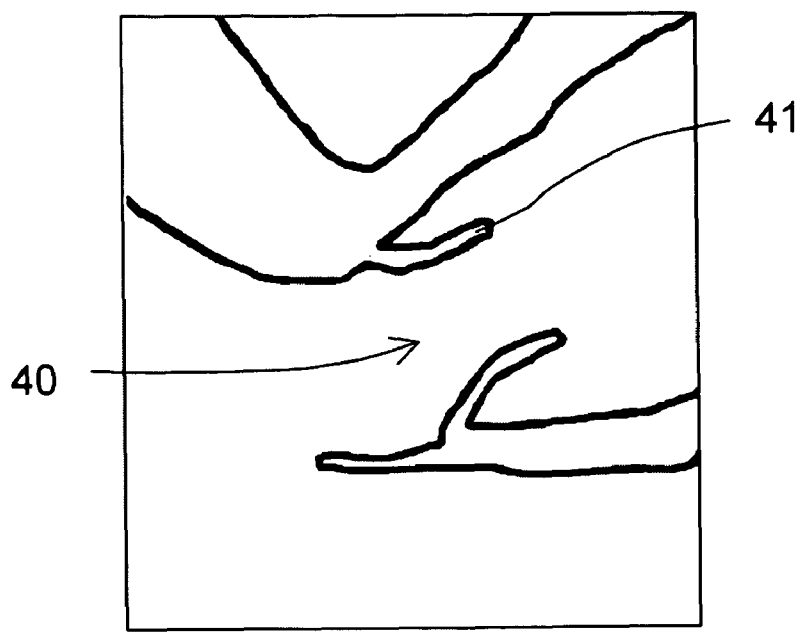
FIG. 17B is a view showing a one-frame image of the aortic valve.

As a measure for solving this problem, a frame image is displayed in a semi-transparent superimposed manner, an inter-frame phase difference is detected, a region to be tracked according to the extent of this phase is specified, information on inter-region attributes (group attribute, permutation, position) is provided, and tracking is performed. Further, the number of frames is increased, search and tracking are performed around a mobile region predicted from a tracking result. For example, FIGS. 17A and 17B show continuous frames of an aortic valve part 40. As shown in these figures, a moment from closing to opening of the aortic valve 41 is tracked in the continuous frames, and the motion is very fast as compared with that in any other region. Therefore, in this inter-frame, it is difficult to perform tracking of the aortic valve part 40 only by making a search for a region with a high degree of coincidence using the coincidence technique. In this case, it is necessary to perform tracking by using the degree of non-coincidence rather than the degree of coincidence.

Figure 17C:
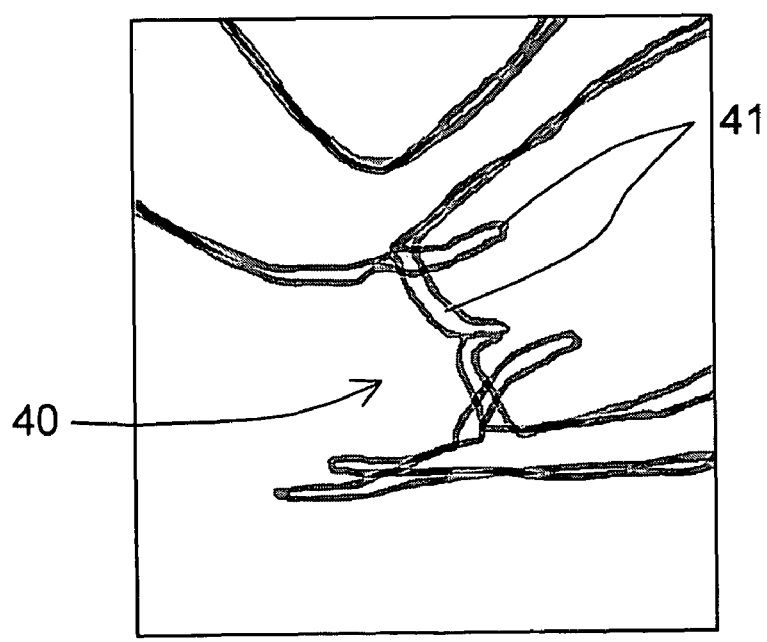
FIG. 17C shows a semi-transparent superimposed screen of FIGS. 17A and 17B.
Figure 17D:
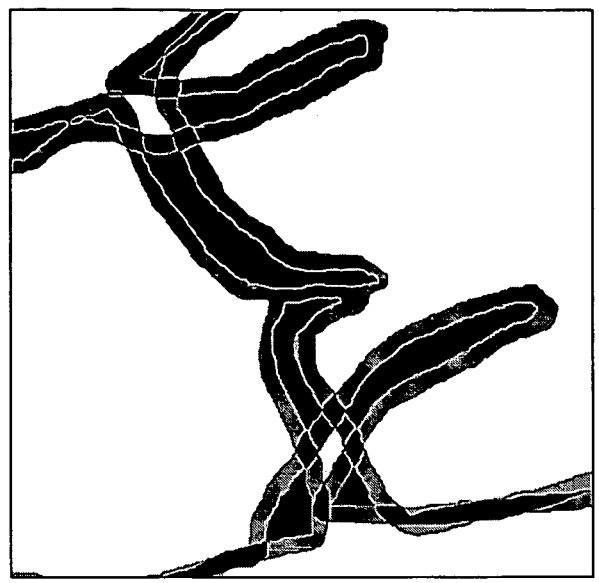
FIG. 17D shows that a region having a large phase difference is identified from the semi-transparent superimposed screen of FIG. 17C and the region having the large phase difference is displayed in a dark gray.
Figure 17E:
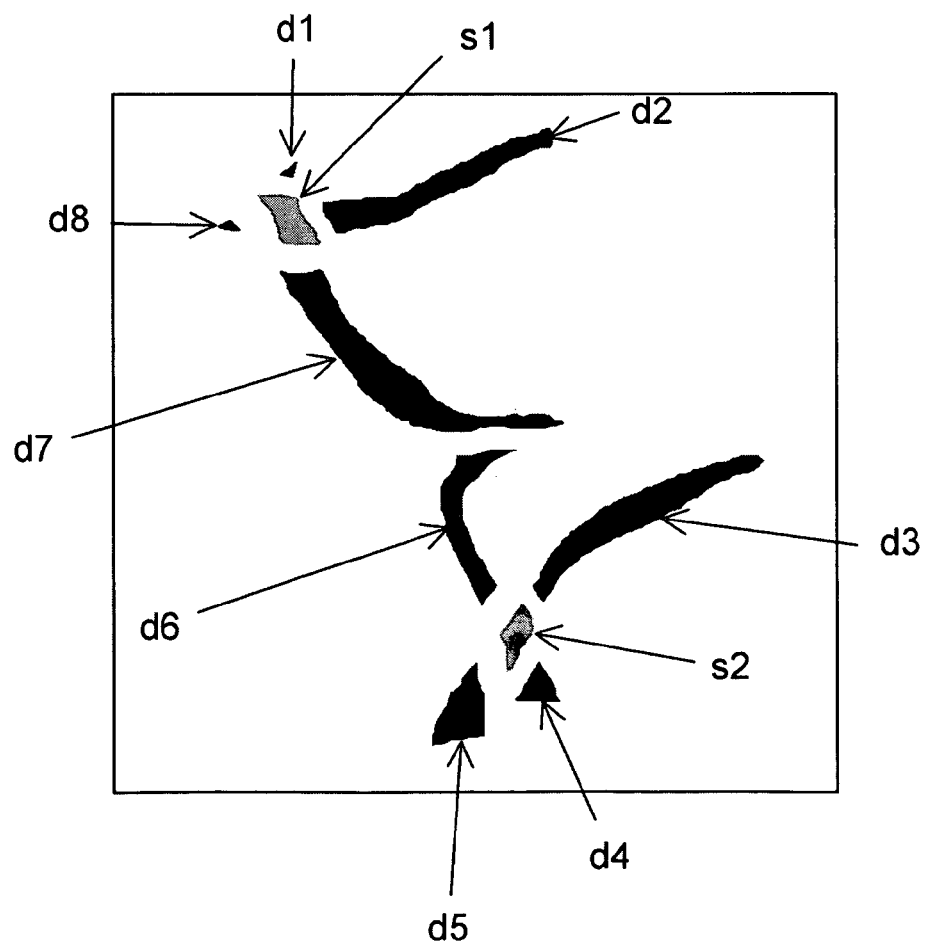
FIG. 17E separately displays regions d1 to d8 (regions indicated by dark gray) having a larger phase difference and (superimposed) regions s1 and s2 (regions indicated by light gray) without a phase difference based on the semi-transparent superimposed screen of FIG. 17C.

FIG. 17C shows a semi-transparent superimposed image of FIGS. 17A and 17B. As is evident from the figure, the aortic valve part 40 is displaced greatly from an original position by opening. FIG. 17D identifies a region with a large phase difference from the semi-transparent superimposed screen of FIG. 17C. In FIG. 17D, a region with a large phase difference is displayed in a region of a dark gray. FIG. 17E shows that regions with a phase difference greater than the semi-transparent superimposed screen of FIG. 17C (regions indicated by dark gray) d1 to d8 and (superimposed) regions free of a phase difference (regions indicated by light gray) s1 and s2 are displayed to be divided. In FIG. 17E, the right coronary cusp of the aortic valve before opening is equivalent to regions d1, s1 and d7, and the right coronary cusp of the aortic valve after opening is equivalent to regions d8, s1 and d2. The noncoronary cusp of the aortic valve before opening is equivalent to regions d4, s2 and d3, and the noncoronary cusp of the aortic valve after opening is equivalent to regions d5, s2 and d3. Then, a motion of the aortic valve 41 shown in FIGS. 17A and 17B can be tracked by adding (associating) inter-region attribute information indicating that the respective regions are the corresponding regions free of change in the connected permutation.

Figure 17F:
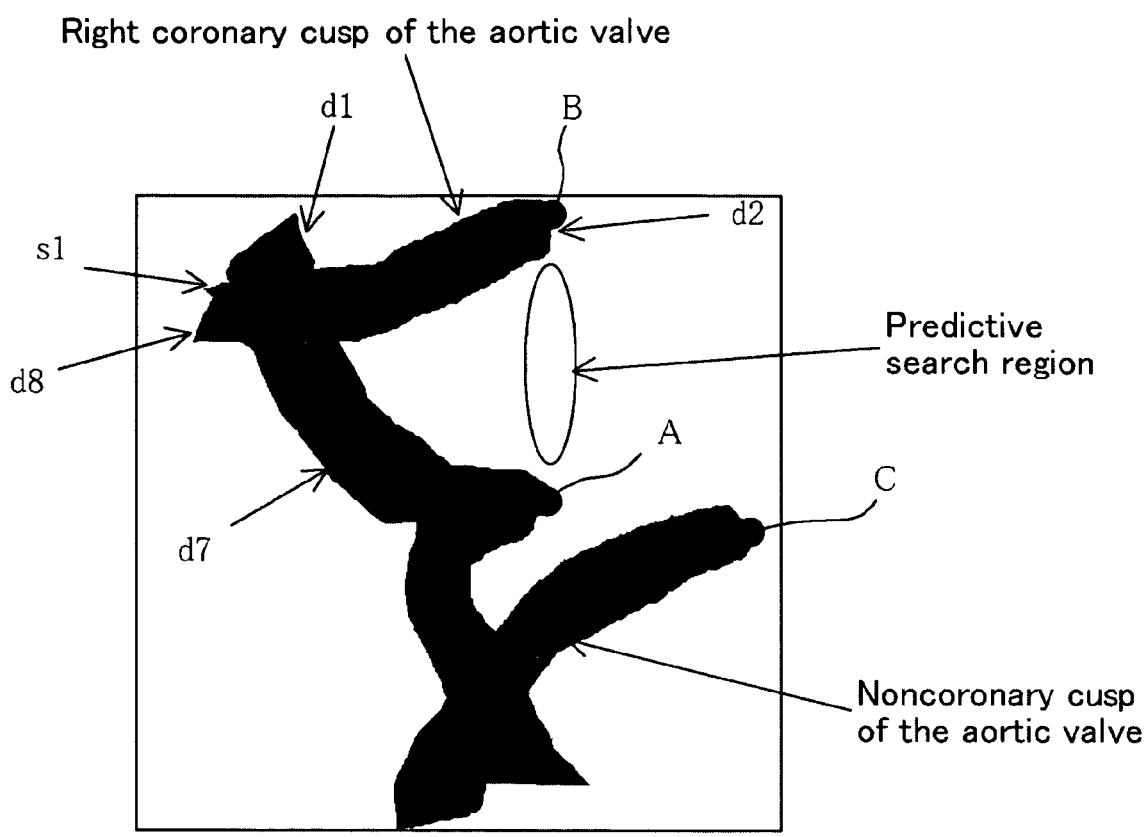
FIG. 17F shows a semi-transparent superimposed screen of the right coronary cusp of the aortic valve of the regions d1, s1, and d7 in which association processing has been applied and the regions d8, s1, and d2.

FIG. 17F shows a semi-transparent superimposed screen of the right coronary cusp of the aortic valve of regions d1, s1, and d7 in which association processing has been applied and regions d8, s1, and d2. In this figure, if the distal end part A of the right coronary cusp of the aortic valve of the regions d1, s1, and d7 is specified, it is easily identified that the region d7 is equivalent to the region d2 based on inter-region association properties, and the distal end part A of the region d7 is equivalent to point B of the right distal end part of the region d2. In this manner, it is found that the distal end part of the right coronary cusp of the aortic valve moves from point A to point B with opening of the aortic valve 41. By means of association processing, it is impossible to track the right-most end C of the noncoronary cusp of the aortic valve of the regions d5, s2, and d3. Further, even in tracking in the case where the number of frames per a unit of time is increased, it is predicted that the above distal end part moves in a region of trajectories A and B. Thus, the search range is narrowed in the region of the trajectories A and B, thereby making it possible to easily track the distal end part of the right coronary cusp of the aortic valve.

In addition, after a start point and an end point are determined as described above, it is possible to utilize two prediction search techniques, i.e., a backward search technique for predicting a transient point and a forward search technique for predicting and making a search for a motion position on the next frame from the motion determined from the analyzed continuous frames.

In the meantime, in the case where point specification is performed, and then, tracking is implemented on a frame by frame basis, an image quality is low at the time of recording; there is a problem with resolution caused by an ultrasonic frequency; an ultrasonic wave is scattered by a myocardium fiber complicated in a layered shape as is the inside of the myocardium; and noise is produced, making it very difficult to perform tracking if spot shaped spot-like speckle patterns discontinuously appear for a frame by frame basis. In such a difficult analysis, a multi-stepped multi-means technique is required.

Figure 18:
FIG. 18 is a view showing a continuous frame of an interventricular septum long axis view.
Figure 19:
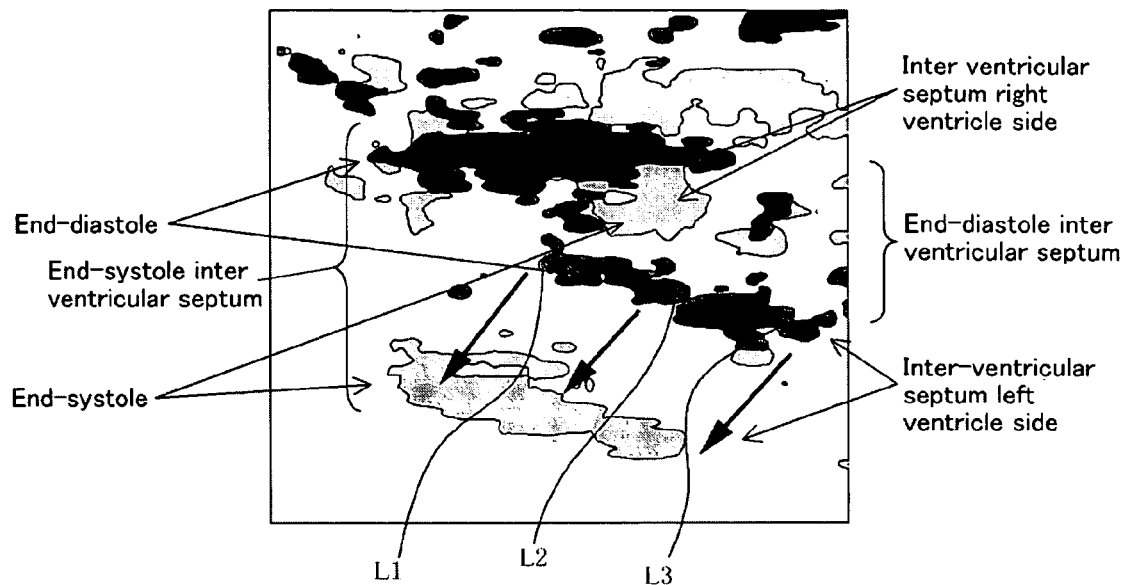
FIG. 19 is a view showing a two-gradation image of an interventricular septum long axis view.

For example, as shown in FIG. 18, a mobile image inputted from a video tape in accordance with a VHS system is degraded in image quality in general, and this analysis is very difficult. Further, in the inside of a myocardium, discontinuous spot shaped images must be tracked. Each frame is optimized in order to improve this degraded image quality and reduce noise. As an example, as shown in FIG. 19, the interventricular septum long axis view is converted to a two-gradation image. As a first step tracking, firstly, the motion in the direction indicated by the arrow is verified with respect to three points L1, L2, and L3 at the interventricular septum left ventricle side internal part in accordance with a phase difference tracking technique from a two-gradation image semi-transparent superimposition screen of the end-diastole (dark gray region) and the end-systole (light gray region).

Next, tracking of three points is properly performed by returning to an image before two-step gradation by adding, to a backward prediction search technique, disposition permutation information on points L1, L2, and L3, supplement information on proximal three points making approximation movements, and relay type tracking technique. A frame which is hardly tracked is decimated and again tracked in accordance with the relay type tracking technique, the backward prediction search technique, and the forward prediction search technique.

Figure 20:
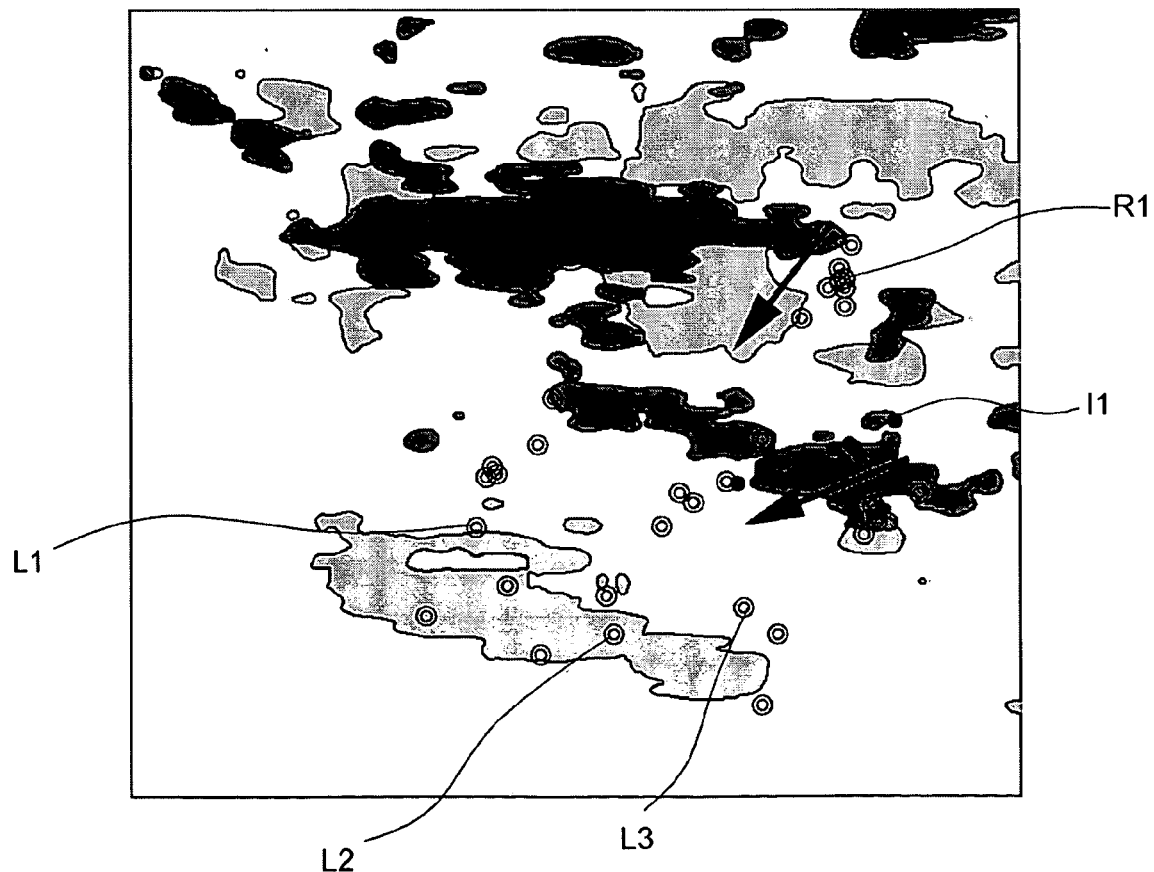
FIG. 20 is a view showing a tracking result.
Figure 21:
FIG. 21 is a view showing a multi-node link display image of three points of the interventricular septum right ventricle side, the inside of the interventricular septum myocardium, and the interventricular septum left ventricle side.
Figure 22:
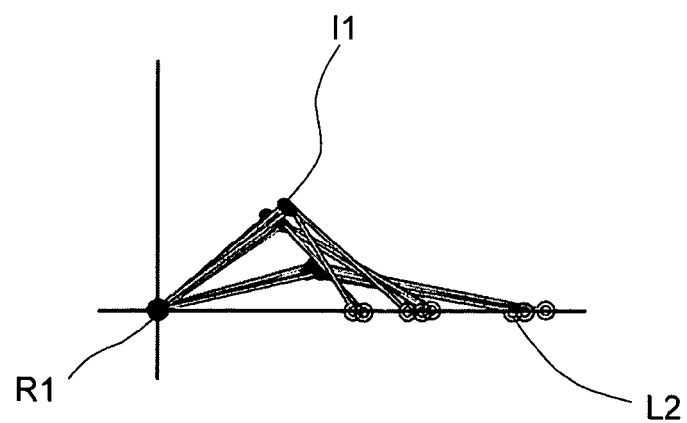
FIG. 22 is a view showing a multi-node link display image of three points of the interventricular septum right ventricle side, the inside of the interventricular septum myocardium, and the interventricular septum left ventricle side after viewing point conversion.

Similarly, FIG. 20 shows a result obtained by tracking point R1 of the interventricular septum right ventricle side tunica intima and point I1 of the interventricular septum myocardium inside. FIG. 21 shows that trajectories relevant to three points R1, I1, and L2 of the interventricular septum right ventricle side, the interventricular septum myocardium, and the interventricular septum left ventricle side are displayed as a multi-node link. FIG. 22 shows that a trajectory is displayed as a multi-node link when viewing point conversion is performed while R1 of FIG. 21 is defined as an origin, and R1-L2 is defined as an axis.

An apparatus, program and method for motion analysis in an internal body according to the present invention are effective as an apparatus, program and method for motion analysis in an internal body by employing a tomographic image. In particular, these apparatus, program and method are preferable as an apparatus, program and method capable of performing diagnosis excluding an effect of the motions of proximal and distant in-vivo local part relevant to a site of the specified in-vivo local part of the internal body.

While there has been described what is at present considered to be a preferred embodiment of the invention, it will be understood that various modifications may be made thereto, and it is intended that the appended claims cover all such modifications as fall within the true spirit and scope of the invention.

What is claimed is:

1. An apparatus for motion analysis in an internal body, the apparatus comprising:
    tomographic image acquisition means for acquiring a tomographic image of a subject;
    point specification means for specifying a plurality of arbitrary points on the tomographic image of the subject obtained by the tomographic image acquisition means;
    viewing point conversion means for (i) selecting at least one of the plurality of arbitrary points specified by the point specification means as an observation point, and (ii) converting a motion of the observation point to a motion obtained by using one of the plurality of arbitrary points other than the observation point as a viewing point; and
    data output means for outputting data obtained by the viewing point conversion means,
    wherein the observation point is one of a plurality of observation points, and
    wherein the data output means forms a multi-node link by connecting the plurality of observation points after conversion to each other by line segments, and outputs data on a motion of the multi-node link.

2. The apparatus for motion analysis in an internal body according to claim 1, wherein the data output means outputs data on a trajectory of the motion of the observation point after conversion.

3. The apparatus for motion analysis in an internal body according to claim 1, wherein the data output means outputs the motion of the multi-node link as data on a motion obtained by using one multi-node link as a reference.

4. A non-transitory computer-readable medium having a program stored thereon for motion analysis in an internal body, the program causing a computer to which tomographic image acquisition means for acquiring a tomographic image of a subject is connected, to function as:
    point specification means for specifying a plurality of arbitrary points on the tomographic image of the subject obtained by the tomographic image acquisition means;
    viewing point conversion means for (i) selecting at least one of the plurality of arbitrary points specified by the point specification means as an observation point, and (ii) converting a motion of the observation point to a motion obtained by using one of the plurality of arbitrary points other than the observation point as a viewing point; and
    data output means for outputting data obtained by the viewing point conversion means,
    wherein the observation point is one of a plurality of observation points, and
    wherein the data output means forms a multi-node link by connecting the plurality of observation points after conversion to each other by line segments, and outputs data on a motion of the multi-node link.

5. A method for motion analysis in an internal body, the method comprising:
    acquiring, using a tomographic image acquisition device, a tomographic image of a subject;
    specifying a plurality of arbitrary points on the acquired tomographic image of the subject;
    selecting at least one of the specified plurality of arbitrary points as an observation point;
    converting a motion of the observation point to a motion obtained by using one of the specified plurality of arbitrary points other than the observation point as a viewing point to obtain data; and
    outputting the obtained data,
    wherein the observation point is one of a plurality of observation points, and
    wherein said outputting comprises forming a multi-node link by connecting the plurality of observation points after conversion to each other by line segments, and outputting data on a motion of the multi-node link.

6. The apparatus for motion analysis in an internal body according to claim 1, wherein the viewing point conversion means fixes a motion of the viewing point, and calculates a relative motion of the observation point with respect to the viewing point.

7. The computer-readable medium according to claim 4, wherein the viewing point conversion means fixes a motion of the viewing point, and calculates a relative motion of the observation point with respect to the viewing point.

8. The method for motion analysis in an internal body according to claim 5, wherein said converting comprises fixing a motion of the viewing point, and calculating a relative motion of the observation point with respect to the viewing point.

* * * * *